Nov. 5, 1957 L. MAGONDEAUX 2,812,427

PASSIVE RADIO COMMUNICATION SYSTEM

Filed Dec. 28, 1953 4 Sheets-Sheet 1

INVENTOR
LEO MAGONDEAUX
BY Kuhman
ATTORNEY

INVENTOR.
LEO MAGONDEAUX
BY
[signature]
ATTORNEY.

INVENTOR
LEO MAGONDEAUX
BY [signature]
ATTORNEY

Nov. 5, 1957 L. MAGONDEAUX 2,812,427

PASSIVE RADIO COMMUNICATION SYSTEM

Filed Dec. 28, 1953 4 Sheets-Sheet 4

INVENTOR
LEO MAGONDEAUX
BY Karl Nau
ATTORNEY

United States Patent Office 2,812,427

Patented Nov. 5, 1957

2,812,427

PASSIVE RADIO COMMUNICATION SYSTEM

Leo Magondeaux, Paris, France, assignor to F. Alexander, New York, N. Y.

Application December 28, 1953, Serial No. 400,606

Claims priority, application France June 27, 1951

6 Claims. (Cl. 250—6)

The present invention relates to a system for and method of radio communication, more particularly to a passive remote control or communication system, also known as a passive responder, wherein only the receiving end of a radio communication or remote control link is powered, while the remote transmitter or responder requires no local source of energizing power for its operation.

The invention has numerous applications, such as in remote control or telemetering systems, in walkie-talkies or other portable or mobile communication units for use by soldiers in combat action, mountain climbers, rescue parties, in radio sondes, traffic control, navigational aids for boats and airplanes, and numerous other uses, where the provision of local power sources, such as generators, batteries, etc. is undesirable or prohabitive from both a convenience and safety point of view.

It has already been proposed to remotely operate or control an electric switch, relay or the like connected in the output circuit of a high-frequency vacuum tube oscillator by means of a key or interrupter inserted in a circuit located near and being coupled with the high-frequency field of the oscillator, said resonant circuit upon closing of the key or interrupter reacting upon and causing a change of the output current of the oscillator sufficient to operate a switch or equivalent translating device.

Remote control systems of this type have a limited range and their use has been practically restricted to such applications as automatic door openers, train control devices, etc. involving relatively short distances between the control point and the oscillator and associated indicating or control device.

Among the more general objects of the present invention is the provision of a passive responder or remote control radio communication system of the type referred to which substantially avoids the limitations and disadvantages of the prior arrangements; which will enable a considerable increase in the range or distance over which "passive" signals can be transmitted compared with the previously known arrangements; which will be equally suitable for transmitting both impulse signals for the operation of a switch or relay at a remote point, as well as for the transmission of complex modulating signals, in particular sound or speech signals.

A more detailed object of the invention is the provision of a passive responder or high-frequency transmitter adapted to be effectively intermittently charged or energized solely by radiant energy from a remote communication station or transmitter and to re-radiate the stored energy with maximum efficiency during the intervals between successive charging periods.

Another object is the provision of a simple and efficient delay means and method of adjusting the same to cause the re-radiated high-frequency energy or echoes of an intermittently energized passive responder to coincide with a desired interval within the spacing distances between the energizing pulses.

Anchillary objects of the invention are to provide a passive responder or remote control device which is of simple design and has a small weight and bulk, to enable its being conveniently carried as a mobile or portable unit; which is instantly ready for communication with a remote station without the disadvantages, danger of failure and other shortcomings of a local energizing power source; and which can be produced economically for use by a greater number of persons during all kinds of emergencies such as accidents, air raids, etc.

With the foregoing objects in view, the invention involves generally the provision at a receiving station of a pulsed oscillator or power transmitter adapted to radiate successive bursts or energizing pulses of high-frequency energy or carrier wave trains of suitable frequency, the pulses being preferably though not exclusively of an equal length or duration and having a repetition frequency substantially less than the carrier frequency but greater than the highest signal frequency component to be transmitted from a cooperating remote passive station or responder. The latter may be located at a substantial distance from the energizing transmitter and comprises a suitable wave collecting or input circuit, such as an antenna, to intercept and receive the energizing wave pulses radiated by said transmitter and suitable means to delay the received energizing pulses by a predetermined time period so as to coincide with and being in turn re-radiated during the spacing intervals between the received energizing pulses. Suitable means are provided to modulate the delayed and re-radiated pulses, such as by means of key, switch, microphone, or the like, in accordance with the information or "passive" signals to be transmitted to the receiving station for reception and demodulation in any suitable manner.

According to a preferred practical embodiment of the invention utilizing a piezoelectric crystal element, referred to hereafter as a "telecrystal," the first or receiving station comprises a superregenerative transceiver of either the self-quenched or separately quenched type and producing a continuous sequence of bursts of high-frequency energy or wave pulses transmitted to a remote passive responder at a repetition frequency equal to the quenching frequency of the transceiver. The remote responder, in order to effect the necessary time delay of the received energizing pulses prior to their re-radiation to the transceiver, includes a piezoelectric crystal (quartz crystal etc.) or an equivalent electromechanical vibratory element tuned to the carrier frequency of the energizing pulses and coupled to an antenna or wave collecting element, in such a manner as to cause the received pulse energy effectively to be stored with a suitable time delay as mechanical vibratory energy in the crystal and to cause the stored energy to be reapplied by the crystal, acting as a temprorary resonating source or generator of high-frequency energy, to the antenna for re-radiation before the arrival of the next energizing pulse. By the proper adjustment or control of the coupling between the input circuit and crystal of the responder, the time delay of the re-radiated pulses may be caused to coincide with the interval of maximum sensitivity of the superregenerative transceiver, i. e. prior or close to the starting of the oscillations at the instant of transition of the conductance of the superregenerative circuit from positive to negative in accordance with the well known function and operation of the conventional superregenerative amplifiers.

The invention will be better understood from the following detailed description of a few practical embodiments considered in conjunction with the accompanying drawings, forming part of this specification and wherein.

Figure 9:
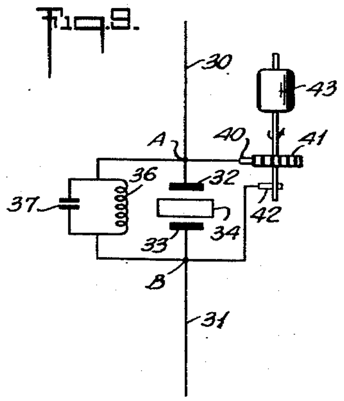
Figure 10:
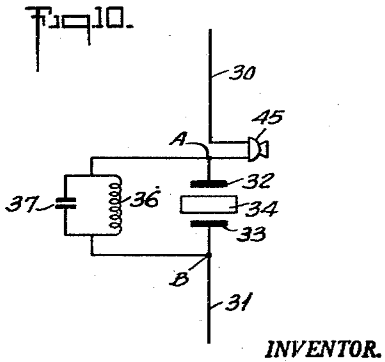
Figure 11:
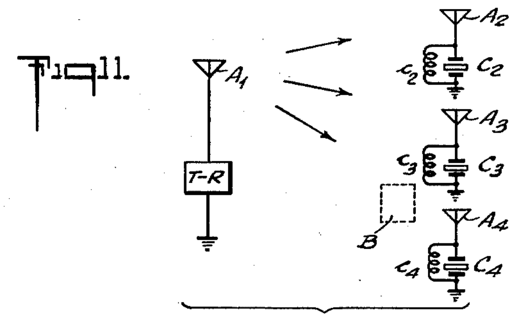
Figure 15:
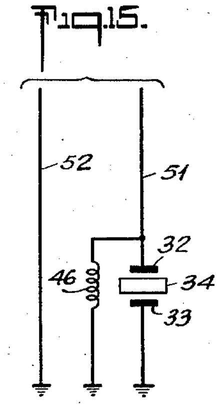
Figure 16:
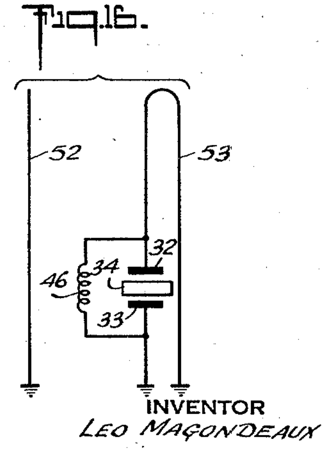
Figure 17:
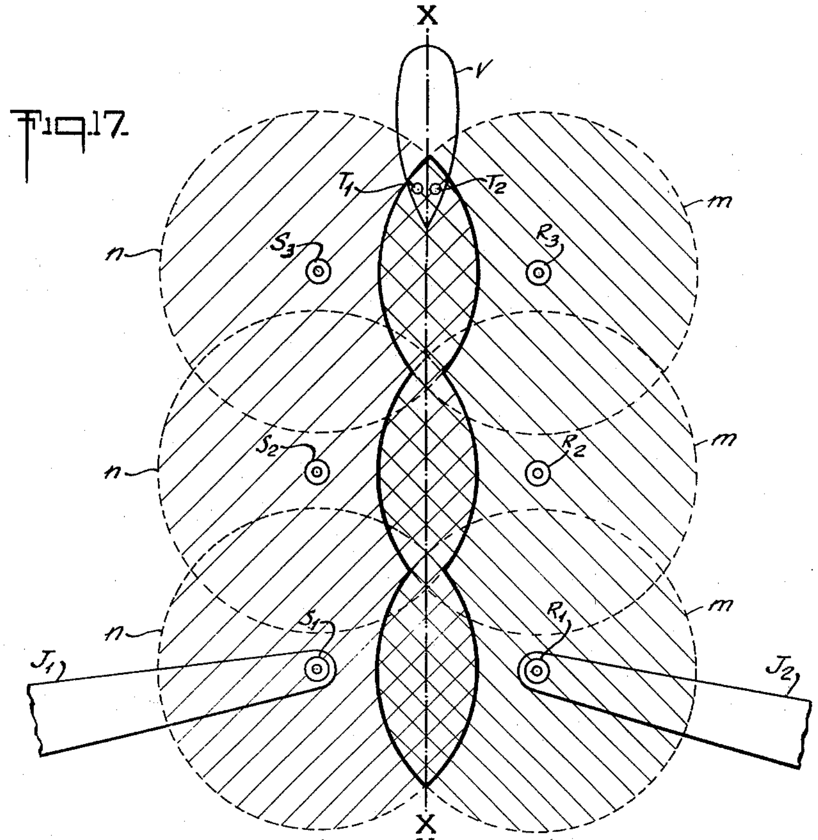
Figure 18:
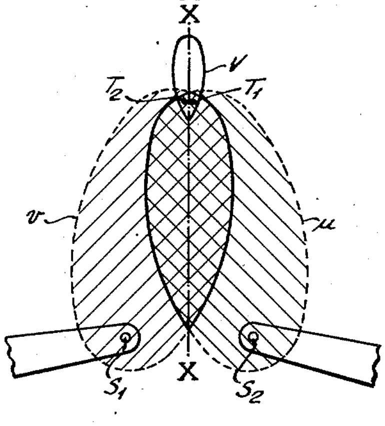

Figs. 7A, 7B, and 8A to 8D show various oscillographic records explanatory of the function of the telecrystal as a time delay element according to the invention;

Figs. 9 and 10 illustrate alternative methods of modulating a telecrystal according to the invention;

Fig. 11 illustrates still another method of effecting remote control by means of a passive or telecrystal responder according to the invention;

Figs. 12 to 16 illustrate further modifications of antenna and telecrystal responder circuits according to the invention; and Figs. 17 and 18 illustrate schematically the use of passive responders according to the invention as navigation aids for ships, planes and other mobile objects.

Like reference character identify like elements throughout the different views of the drawings.

Figure 1:
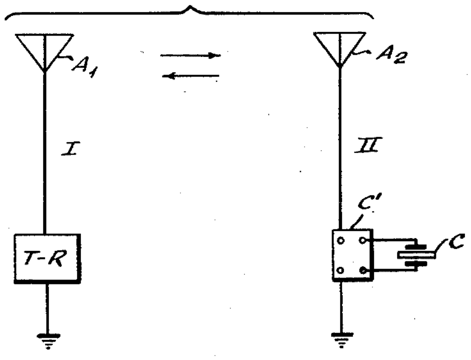
Fig. 1 shows diagrammatically a basic passive responder system embodying the principles of the invention.
Figure 2:
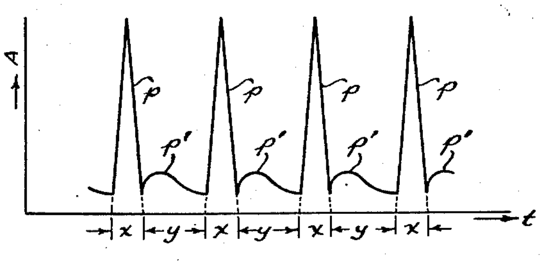
Fig. 2 is a graph showing the energizing and echo pulses in a telecrystal responder according to the invention.

Referring to Figs. 1 and 2, there is shown diagrammatically a pulsed transmitter-receiver T-R located at a first station I and energizing an antenna $A_1$ which serves to radiate successive bursts or energizing wave pulses $p$ of high frequency energy having a pulse width or duration $x$ and pulse spacing intervals $y$, as indicated by Fig. 2 showing the eneveloping curve of the high frequency amplitudes. The radiated pulses are received by the antenna $A_2$ of a passive responder located at a remote point or station II and including a suitable delay device in the form of a piezoelectric crystal resonator C or equivalent electromechanical vibratory storage element resonant to the carrier frequency of the received pulses and being suitably coupled with the input circuit or antenna $A_2$ through a coupling device or impedance C′. As a result of the effect of the crystal C in temporarily storing or delaying the received pulses $p$, the delayed pulses will be re-applied to the antenna and reradiated in the form of reflected pulses or echoes $p'$ to the station I during the pulse spacing intervals $y$. By modulating the pulses $p'$ by means of an interrupter, microphone or the like, control signals or any other information can be transmitted by the passive responder or station II to the station I without requiring any source of energizing power. A more detailed representation of the energizing pulses $p$ and reflected signals $p'$ appears in Figs. 7A and 7B.

The transmitter-receiver T-R may be of any suitable type, such as a conventional pulse radar transmitter including means to prevent direct interference between the generated pulses $p$ and the receiver circuit, such as an automatic transmit-receive switch provided in conventional radar systems.

For relatively short ranges, the use of a super-regenerative transceiver of known design has been found to be especially suitable for the purpose of the invention. In the latter case, transmission and reception are alternately achieved by the inherent function of the conventional superregenerative oscillator or amplifier. A simple transceiver circuit of this type is shown by way of example in Fig. 3 and may comprise a triode vacuum tube 10 having an anode, a cathode and a grid or control electrode. Connected between the anode and the control electrode is a tuned or resonant circuit including an inductor 11, a variable capacitor 12 and a blocking capacitor 13. Connected between the control electrode and the cathode is a blocking circuit comprising a radio frequency choke coil 14 and a capacitor 15 the latter being shunted by a variable resistor 16. A transmitting inductor 17 is coupled with the inductor 11 of the oscillatory circuit and connected to a transmitting antenna 18. Connected between the anode and cathode is a source of direct current potential 20 which may be a battery as indicated in the drawing or any other suitable source of direct current power well known in the art. This circuit also includes the winding 21 of a relay 22 and a radio frequency choke coil 24 being connected between the winding 21 and the anode. A by-pass capacitor 25 is connected between the cathode and the junction between the winding 21 and choke coil 24. The output circuit of the relay includes the relay armature, contact 23, a source of current 26 and a load 27 shown in the form of a resistor, but which may take various forms such as a motor, lamp or any other visual or acoustic indicator or translating device. Alternatively, the relay winding 21 may be replaced by a receiver or translating device, such as a telephone, loudspeaker, or the like.

Figure 3:
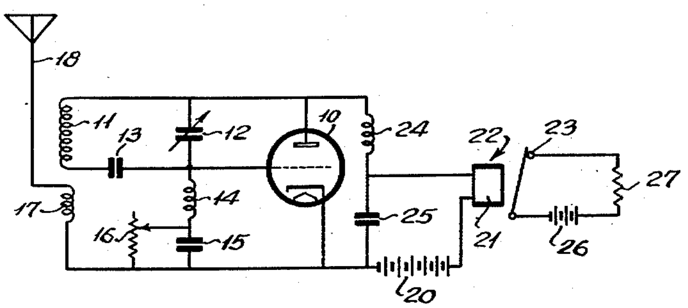
Fig. 3 is a circuit diagram of a simple superregenerative transceiver suitable for use in connection with the invention.

The circuit according to Fig. 3, representing a simple self-quenched superregenerative oscillator, operates in the well known manner by intermittently building up oscillations in the tuned circuit 11, 12, 13 as a result of the regenerative feedback coupling of the anode and grid circuits through the grid-cathode capacity of the tube, until the blocking capacitor 15 has stored a sufficient negative charge to reduce the potential of the control electrode to a value below the cut-off point of the tube. This action stops the oscillation and then permits the charge on the capacitor 15 to leak off through the resistor 16 during the interrupting or quenching period. The latter action returns the control electrode to its normal operating potential, thus initiating the next oscillating cycle. In other words, the super-regenerative operation results in a periodic change of the conductance of the oscillatory circuit 11, 12, 13 between negative and positive during the alternate oscillating and quenching cycles, respectively, with the average negative conductance exceeding the average positive conductance, so as to enable a substantial amplification or gain of an impressed input signal of a frequency equal to the resonant frequency of the circuit 11, 12, 13 by a single amplification stage. The quenching or repetition frequency of the oscillation bursts thus produced and radiated by the antenna is determined by the values of the blocking capacitor 15 and discharge resistor 16 and for practical purposes should be related to the carrier frequency of the oscillation or resonant frequency of the circuit 11, 12, 13 by a ratio of 1:100 to 1:1000. Instead of a self-quenched oscillator, a separately quenched circuit of any known design may be employed operating in either the linear or logarithmic mode, as shown and described, for instance, in the Radio Engineers Handbook by Frederick Emmons Terman, First Edition, 1943, pages 662 to 664.

The above described operation is well known and characteristic of all superregenerative circuits. According to a practical example, the carrier or resonant frequency of the tuned circuit 11, 12, 13 may be of the order of 20 to 100 mc., while the quench frequency may be from 20 to 100 kc. per second, the value of 20 kc. constituting the lower limit for transmission of speech in assuming a maximum speech frequency component of 3 kc. and a pulse repetition or quench frequency of about six times this value.

As is understood, any superregenerative circuit of either the self-quenched or separately quenched type may be used for the purpose of the present invention to simultaneously generate and transmit energizing wave pulses of a desired carrier and pulse repetition frequency and to receive the delayed and modulated pulses upon reradiation by a remote responder in accordance with the invention.

Figure 4:
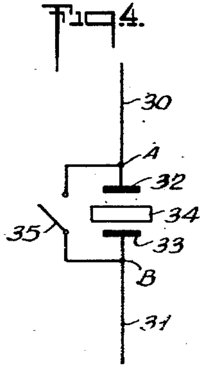
Figs. 4 and 5 are diagrams of simple telecrystal responder circuits according to the invention.
Figure 5:
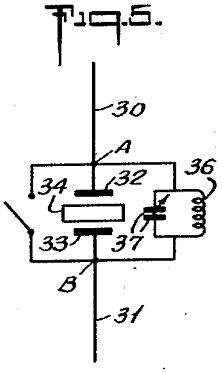

Referring to Figs. 4 and 5, there are shown examples of simple telecrystal responder circuits suitable for co-operation with the transceiver according to Fig. 3 and comprising a dipole or half-wave doublet antenna having branches 30 and 31. Two capacitor plates 32 and 33 are mounted on either side of a quartz crystal 34 or the equivalent, forming a piezoelectric component which is connected between the two dipoles or antenna terminals A and B. Item 35 is a short-circuiting switch which serves as a signal or control device shunting the crystal and antenna terminals A and B. In the arrangement according to Fig. 5, there is provided an additional tunable circuit comprising an inductor 36 and a variable capacitor 37 and connected across the crystal or terminals A, B. Circuit 36, 37 provides an adjustable impedance to properly match or provide a desired mutual coupling between the antenna 30, 31 and the crystal 32, 33, 34, in the manner as will be further understood from the following. More specifically, the circuit 36, 37 represents an inductive or capacitative impedance connected across the crystal and antenna, depending upon its tuning adjustment in relation to the resonant frequency of the crystal, whereby to control the degree of coupling between the antenna as an input circuit and the crystal as a secondary or output circuit.

Figure 6:
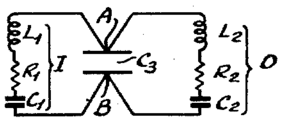
Fig. 6 shows the equivalent electrical network of a simple telecrystal responder according to Figs. 4 and 5.

The function of the telecrystal or responder in delaying and reflecting the received energizing pulses will be further understood by reference to Figs. 6, 7A, 7B and 8A to 8D. For this purpose there is shown in Fig. 6 the equivalent or substitute electrical network of a telecrystal responder according to Figs. 4 and 5, comprising a primary or input resonant circuit I represented by the inductance $L_1$, resistance $R_1$ and capacitance $C_1$, respectively, of the antenna 30, 31 and coupled with a secondary or output resonant circuit O represented by the equivalent inductance $L_2$, resistance $R_2$ and capacitance $C_2$, respectively, of the crystal 32, 33, 34, the coupling between the two circuits being by way of a capacitor $C_3$ provided by the electrostatic capacitance between the crystal electrodes 32 and 33. If the capacity $C_3$ of the crystal is inadequate to provide a proper coupling between the circuits I and O to cause a desired delay or shape of the re-radiated pulses, the multiple tuned circuit 36, 37 of Fig. 5 upon proper adjustment serves to control the coupling for optimum operation and efficiency of the circuit.

Figure 7A:
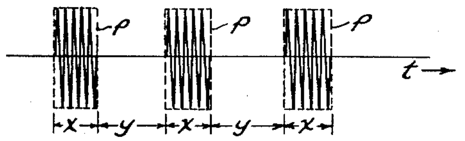
Figure 7B:
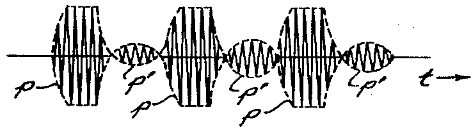

In a network comprising the circuits I and O, and coupling capacitor $C_3$, Fig. 6, the antenna or input circuit I has a relatively low quality factor or Q ($\omega L/R$), while the secondary circuit O represented by the crystal has a Q considerably higher than the Q of the input circuit. As an example, the circuit I may have a Q of 10 while the Q of the crystal or equivalent circuit O may be of the order of 5000. This difference in the Q values results in a substantial delay of the conversion of the high-frequency electric energy into mechanical vibratory energy of the crystal and re-radiation of the delayed pulses by the circuit I. Thus, referring to Fig. 7A, there are shown three incoming high-frequency energizing pulses $p$ having a width or duration $x$ and being separated by spacing intervals $y$ corresponding to the oscillating and quenching periods, respectively, of the superregenerative transceiver or equivalent transmitting system. For simplicity's sake, the wave pulses are shown of rectangular form, that is, with a constant radio frequency amplitude. The pulses may, however, be of any form, as is understood, such as triangular, as shown in Fig. 2. The primary circuit I of the responder, Fig. 6, upon being excited by the received pulses $p$, acts to build up R. F. oscillations which latter decay rapidly, as shown in Fig. 7B. At the same time the crystal or secondary circuit O receives radio frequency energy through the coupling capacitor $C_3$, its relatively high Q causing a substantial time delay, in such a manner that the secondary oscillations reach their maximum at a time during the spacing periods or quenching intervals $y$, provided an adequate mutual coupling of the circuits. As a result, the secondary pulses shown at $p'$ in Fig. 7B are re-applied to the primary circuit I substantially instantly, on account of the relatively low Q of the latter compared with the Q of the secondary circuit O, whereby the pulses will be re-transmitted as reflected pulses or echoes during the spacing intervals $y$ and received by the remote transceiver. By suitably modulating the instantaneous pulse amplitude of the re-transmitted pulses, as indicated in Fig. 7B, any desired signal or information may be transmitted by the passive responder to its energizing station or any other remote point provided with a suitable receiver, in the manner readily understood from the above.

Figure 8A:
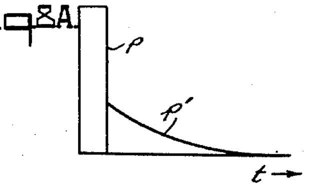
Figure 8B:
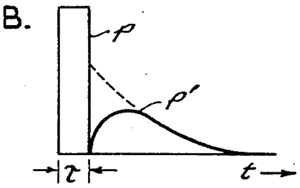
Figure 8C:
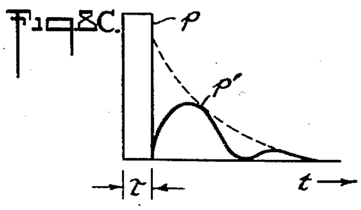
Figure 8D:
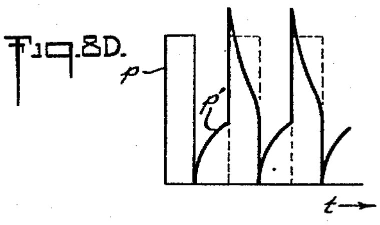

Referring more particularly to Figs. 8A and 8D, there have been shown various shapes of the secondary response or delayed pulses $p'$ for different degrees of mutual coupling between the antenna and the crystal or the equivalent circuits I and O, respectively. These curves represent actual oscillographic records of the voltage envelope between points A and B of the transponder. More specifically, Fig. 8A shows the case of a relatively loose coupling (at or near critical coupling) with the response $p'$ forming a gradually decreasing trail of the primary pulse $p$, while Figs. 8B, 8C and 8D show the case of gradually increased coupling between the circuits (coupling beyond the critical value). In Fig. 8B a pronounced peak or echo $p'$ is obtained, while further increase of the coupling results in multiple peaks, as shown by Fig. 8C and an instantaneous peak in excess of the primary pulse amplitude as shown in Fig. 8D. In other words, little return flow of energy occurs during the excitation of the crystal, in case of Fig. 8A, while in the case of closer coupling according to Figs. 8B and 8C, enough impedance is coupled from the crystal into the antenna circuits during the excitation or energizing periods to cause discrete peaks or echo pulses $p'$. In Fig. 8C only the first echo pulse has any usefulness for re-transmission of indicated signals, as will be understood.

By choosing a proper coupling between the input circuit and the crystal, it is thus possible to obtain a favorable echo or peak response $p'$, whereby to cause the received signal pulses at the transceiver station to coincide with the interval or region of maximum sensitivity of the superregenerative circuit prior to the transition from the quenching to the oscillating periods of the circuit.

While the mode of operation according to Fig. 8A with the response $p'$ forming a more or less continuous trail of the exciting or energizing pulse $p$ may be employed to give satisfactory results in practice, increased efficiency and other improved results will be obtained by a responder according to Figs. 8B or 8C, i. e. with the response $p'$ forming a discrete secondary pulse or echo of high peak power and being delayed by a predetermined interval from the main or energizing pulse $p$. Not only is it possible in this manner to concentrate the reflected energy into a short peak suitable for modulation according to the instantaneous values of a passive modulating signal to be transmitted, but the delay of the radiated pulses $p'$ may be controlled, by the proper adjustment of the coupling between the antenna and the crystal, so as to coincide with the intervals of greatest sensitivity of the superregenerative receiver during its quenching cycles. In this manner, both the stability and sensitivity of the responder system will be increased considerably.

In order furthermore to insure maximum efficiency of the responder system, the width or duration $\tau$ of the energizing pulses, Figs. 8B and 8C, is so chosen as to effect a charge of the crystal or build up of its mechanical vibratory energy to a point close to its saturation, to insure a maximum energy storage and maximum strength of the passive signal pulse. In the case of speech signals, this may place a certain restriction on the Q of the crystal, due to the lower limitation of the quench frequency and minimum charging period available for the crystal. Thus, assuming a maximum speech frequency component of 3 kc. and a quench frequency at least four times this value or 12 kc., in order to insure adequate intelligibility, the total quench period will be 80 microseconds, resulting in a pulse width or time available for exciting or charging the crystal of 40 microseconds. Assuming further a maximum charge of the crystal to 80% of saturation, it can be shown that the necessary pulse width in microseconds is related to the Q of the crystal as follows: $Q=80\tau=80.40=3200$. If a crystal is used having a Q higher than this value, its charge will be less than the desired minimum, whereby to result in decreased efficiency and range of the responder. On the other hand, in the case of simple switching or telegraph signals requiring a considerably reduced frequency band, it is understood that a crystal having a considerably higher Q can be used to increase the range or sensitivity of the responder system.

There is thus provided by the present invention a passive signal transmitter or responder of great simplicity, using a piezoelectric or equivalent electromechanical vibratory element as a means for effecting a time delay of the passive and modulated echo signals derived from an intermittent pulsed energizing signal received from a cooperating transmitting and receiving station.

Referring to Fig. 9, there is shown a responder circuit according to the invention similar to Figs. 4 and 5 using a motor operated switching device or rotary interrupter in place of the manually controlled switch or key 35. In the example shown, the arrangement includes a contact member or brush 40, a contact wheel 41 having alternate conducting and insulating segments, a slip ring brush 42 and a motor 43 driven in any suitable manner. This arrangement produces an alternating current in the output circuit of the superregenerative transceiver of Fig. 3 as a result of the rapid cyclic operation of the short-circuiting device shunted across the crystal or antenna terminals A and B. It will be obvious that such a control circuit may be used in many ways, such as for operating an alternating current device in the load circuit of the superregenerative transceiver and for providing additional information based on the frequency of operation of the short-circuiting device.

If the responder is used for remote control by operation of the switch 35 and control of the relay 22 in Fig. 3, closing of the switch causes an interruption of the re-radiated signals and a corresponding change of the average anode current of the oscillator 10 to result in actuation of the relay, in a manner readily understood. If the re-radiated pulses are modulated by a microphone or similar control device, the detected or demodulated signals may be derived by an earphone, loudspeaker, etc. directly from the output of the tube 10 or through a separate detector or rectifier in accordance with conventional superregenerative receiving methods.

Fig. 10 shows a responder system, wherein a microphone 45 of suitable construction is connected in series with the antenna 30, 31 for modulating the re-radiated or echo pulses in accordance with sound or speech, such as indicated in Fig. 7B. If sharp echo pulses occur, as in Figs. 8B and 8C, the ensuing modulation by energy absorption by the microphone involves a sampling or pulse amplitude modulation in such a manner that, provided a proper delay or displacement of the re-radiated pulses, the received pulses in the oscillatory circuit of the superregenerative receiver cause a proportionate advance of the starting or initiation of the oscillations and corresponding modulation of the quench frequency, as in any conventional self-quenching superregenerative receiver. The same applies when using a separately quenched superregenerative receiver, in which case the oscillating pulses will be either amplitude or width modulated by the received passive signal pulses, provided again a proper delay of the latter so as to coincide with the most sensitive intervals of the circuit, the amplitude or width modulation depending upon the operation of the circuit in either the logarithmic or linear mode, respectively, in a manner well known in connection with superregenerative receivers.

While in the drawing the microphone is shown inserted in the antenna circuit, it is understood that the same may be connected in parallel or across points A and B, with or without additional impedance matching devices, to act as a means for absorbing varying amounts of power and to accordingly modulate the re-radiated signal energy.

In place of directly varying or modulating the re-radiated energy pulses, the latter may be controlled by a foreign object B, such as a human body, Fig. 11, in the neighborhood of the responder, modifying the antenna impedance or completely intercepting the re-radiated signals. Such device is especially suited, among many other uses, as a warning or burglar alarm system and may comprise a plurality of passive responders, as shown in the drawing, comprising antennae $A_2$, $A_3$, $A_4$, telecrystals $C_2$, $C_3$, $C_4$ and matching inductors $c_2$, $c_3$, $c_4$, respectively, and being suitably distributed at strategic points within the space or area to be protected. All the responders are remotely energized by a single superregenerative transceiver T-R, in such a manner that interception or modification of the antenna field of any of the responders by the body B will result in a warning or alarm signal at the transceiver, in a manner readily understood from the foregoing.

Figure 12:
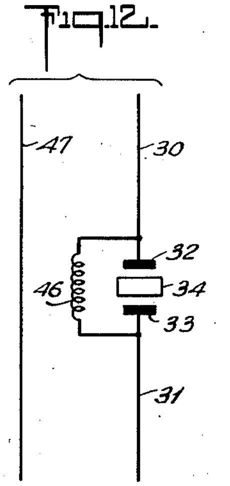

Figs. 12 to 15 illustrate alternate responder systems according to the invention for either omni-directional or directive reception and signal transmission. More specifically, Fig. 12 shows a responder having a dipole 30, 31 serving as a receiving or input antenna, a coupling inductor 46 and a reflector 47 arranged at a proper distance to provide a desired degree of directivity for the received signal pulses and to improve the response or range, in a manner well understood.

Figure 13:
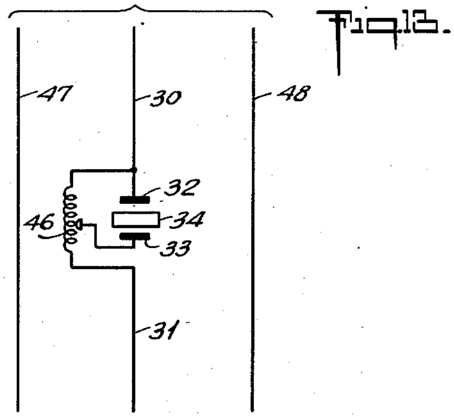

Fig. 13 is similar to Fig. 12 and includes means in the form of a director rod in front of the dipole to further increase the directional effect of the responder.

It will be understood, in order to provide a proper impedance match or coupling between the antenna and telecrystal, any other known means such as a transformer coupling, as shown in Fig. 13, may be employed for the purpose of the invention.

Figure 14:
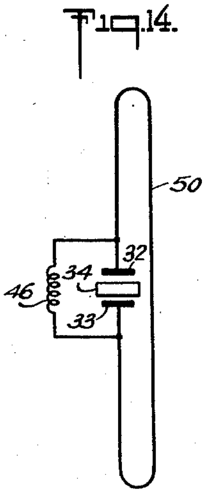

Fig. 14 shows another arrangement of a telecrystal responder according to the invention using a folded dipole 50 of known construction to increase the range and/or directional sensitivity of the responder, while Figs. 15 and 16 illustrate the use of a grounded or quarter-wave antenna, both single or double with or without reflectors, and director elements.

Referring to Fig. 17, there is shown diagrammatically a navigational system comprising a plurality of telecrystal responders according to the invention and arranged to define a navigational channel or path X—X for a moving object such as a vessel V entering a harbor between two jetties $J_1$, $J_2$. The operation of such a system may be according to the well known equi-signal method for guiding airplanes in flight or during landing. In the example shown, there are provided for this purpose a plurality of pairs of telecrystal responders $S_1$—$R_1$, $S_2$—$R_2$, and $S_3$—$R_3$ arranged at equal distances on opposite sides of the channel or path X—X. The responders $S_1$, $S_2$, $S_3$ on one side of the channel are resonant to a carrier frequency $f_1$ and cooperate with a first superregenerative transceiver $T_1$ on board the vessel V, while the responders $R_1$, $R_2$ and $R_3$ on the opposite side of the channel are resonant to a carrier frequency $f_2$ and cooperate with a second superregenerative transceiver $T_2$ on the vessel V. The advantage of such a system is due to the fact that the responders defining the channel or path X—X need no energizing power or attendance, aside from their constructional simplicity and small weight and bulk.

In operation, the transmitters $T_1$ and $T_2$ may be keyed according to a pair of interlocking Morse signals, such as the letters *m* and *n*, the reflected and received signals serving to operate a pair of visual or oral indicators. If all the responders are of equal design so as to provide equal and symmetrical polar field strength patterns, as shown at *m* and *n*, respectively, there will be defined in this manner an equi signal area along the channel X—X enclosed by the heavy lines and corresponding to the overlapping area of the patterns, as shown in the drawing. If interlocking signals are used, as pointed out, it is merely necessary for the navigator aboard the vessel V to maintain a course as to cause both signals to merge into a continuous dash. The predominance of one or the other interlocked signals instantly indicates a deviation in one or the other direction from the path or channel X—X. In place of a pair of transceivers $T_1$ and $T_2$ on the vessel V, a single transceiver may be provided operated alternately at different carrier frequencies and at a suitable repetition rate, the signals received from the different responders being separated by snychronous switching devices, in a manner readily understood by those skilled in the art.

In order to reduce the number of responders in a system of the type described, a single pair $S_1$—$R_1$ embodying suitable reflector and director elements, may be employed to provide a pair of narrow directional patterns *v* and *u* of increased directional effects and shown by Fig. 18.

In the foregoing the invention has been described with reference to a number of specific illustrative devices. It will be evident, however, that numerous variations and modifications, as well as the substitution of equivalent circuits and elements for those shown herein for illustration may be made without departing from the broader scope and spirit of the invention as defined in the appended claims. The specification and drawings are accordingly to be regarded in an illustrative rather than in a limiting sense.

This application is a continuation-in-part of application Serial No. 292,813, filed June 11, 1952, now abandoned.

What is claimed is:

1. A radio signalling system comprising a transmitter adapted to radiate a series of primary high frequency wave pulses having a predetermined recurrence frequency, a passive responder remote from said transmitter including antenna means to receive said primary pulses and electromechanical vibratory reflecting and delay means connected thereto, to delay substantially in their entirety the received primary pulses, said delay means having a delay time correlated to said pulse recurrence frequency, to cause the reflected and delayed pulses to be reradiated as passive wave pulses by said antenna means within the spacing intervals of and in substantial time-separated relation to said primary pulses, means to modulate said passive wave pulses prior to reradiation according to a signal to be transmitted by said responder, and means associated with said transmitter to receive and demodulate said passive wave pulses independently of said primary wave pulses.

2. A radio signaling system comprising a transmitter adapted to radiate a series of primary high frequency wave pulses, a passive responder remote from said transmitter comprising an antenna having a relatively low Q and an electromechanical vibratory element resonant to the carrier frequency of said wave pulses, mutual reactive coupling means between said antenna and said element, to effect a time delay of the received primary wave pulses and to cause the delayed wave energy to be re-radiated by said antenna in the form of secondary wave pulses during the spacing intervals between and in substantially time-separated relation to the respective primary wave pulses, means to modulate said secondary wave pulses prior to re-radiation in accordance with a signal to be transmitted by said responder, and means associated with said transmitter to receive and demodulate said secondary wave pulses independently of said primary pulses.

3. A radio signaling system comprising a transmitter adapted to radiate a series of primary high frequency wave pulses, a passive responder remote from said transmitter comprising an antenna and a piezoelectric crystal element resonant to the carrier frequency of said wave pulses and having a pair of exciting electrodes reactively coupled with said antenna, to effect a time delay of the received primary wave pulses and to cause the delayed wave energy to be re-radiated by said antenna in the form of secondary wave pulses during the spacing intervals between and in substantially time-separated relation to the respective primary wave pulses, means to modulate said secondary wave pulses prior to re-radiation in accordance with a signal to be transmitted, and means associated with said transmitter to receive and demodulate said secondary pulses independently of said primary pulses.

4. A radio signalling system comprising a superregenerative transceiver adapted to radiate a series of primary high frequency wave pulses having a predetermined recurrence frequency, a passive responder remote from said transceiver including antenna means to receive said primary pulses and electromechanical vibratory reflecting and delay means connected thereto, to delay substantially in their entirety the received primary pulses, said delay means having a delay time correlated to said recurrence frequency, to cause the reflected and delayed pulses to be reradiated as passive pulses by said antenna means in substantial time-separated relation to said primary pulses and coinciding with the periods of maximum sensitivity of said transceiver to incoming radio signals, means to modulate said passive wave pulses prior to reradiation according to a signal to be transmitted by said responder, and means to derive a demodulated output signal from said transceiver.

5. A radio signaling system comprising a superregenerative transceiver adapted to radiate a series of primary high frequency wave pulses during the periodic oscillating cycles of said transceiver, a passive responder remote from said transmitter comprising an antenna having a relatively low Q and a piezoelectric crystal element resonant to the carrier frequency of said wave pulses and having a pair of exciting electrodes mutually reactively coupled with said antenna, to effect a time delay of the received primary wave pulses and to cause the delayed wave energy to be re-radiated by said antenna in the form of secondary wave pulses during the spacing intervals between and in substantially time-separated relation to the respective primary pulses, said secondary pulses substantially coinciding with the periods of maximum response of the oscillations of said transceiver to incoming radio signals, means to modulate said secondary wave pulses prior to re-radiation according to a signal to be transmitted by said responder, and means to derive a demodulated output signal for said transceiver.

6. In a system as claimed in claim 5, wherein said modulating means consists of an energy absorption device arranged to vary the energy radiated by said antenna.

References Cited in the file of this patent

UNITED STATES PATENTS

| | | |
|---|---|---|
| 1,779,259 | Miessner | Oct. 21, 1930 |
| 1,821,032 | Robinson | Sept. 1, 1931 |
| 1,864,543 | Horton | June 28, 1932 |
| 2,460,827 | Isely | Feb. 8, 1949 |
| 2,461,646 | Lewis | Feb. 15, 1949 |
| 2,505,525 | Capp et al. | Apr. 25, 1950 |
| 2,511,409 | Mayberry | June 13, 1950 |
| 2,539,476 | Rines | Jan. 20, 1951 |